April 21, 1925.

W. H. COLLIER

MACHINE FOR CUTTING VENEER

Filed July 31, 1922

Inventor
William H. Collier.

By Eugene C. Brown
Attorney

Patented Apr. 21, 1925.

1,534,687

UNITED STATES PATENT OFFICE.

WILLIAM H. COLLIER, OF PAINESVILLE, OHIO.

MACHINE FOR CUTTING VENEER.

Application filed July 31, 1922. Serial No. 578,775.

*To all whom it may concern:*

Be it known that I, WILLIAM H. COLLIER, a citizen of the United States, residing at Painesville, in the county of Lake and State of Ohio, have invented certain new and useful Improvements in Machines for Cutting Veneer, of which the following is a specification.

This invention relates to machines for cutting continuous sheets into lengths or panels of any desired size, and is especially adapted for cutting veneer. This machine is an improvement upon my prior patent No. 1,438,810, dated Dec. 12, 1922.

One object of my invention is to provide a machine having means under the control of the operator for quickly moving the sheet across the table until it strikes the gauge stops, which have been adjusted to measure the desired length, and after the cutter has severed the sheet, removing the severed length from the rear end of the table during the upward return stroke of the cutter. Another object is to provide means under the control of the operator's foot for permitting the feed and delivery chains of the table to continue in operation as long as desired for the purpose of removing defective portions of the veneer sheet without operating the cutter, thus temporarily suspending the normal operation of the machine. I further provide means for automatically disconnecting the power from the feed chains during the operation of the cutter knife.

In the following detailed description of the machine and its operation I shall refer to the accompanying drawings in which Fig. 1 is a side elevation of a machine embodying my invention; Fig. 1ª is a detail sectional view on the line 1ª—1ª of Fig. 1; Fig. 1ᵇ is a detail sectional view on the line 1ᵇ—1ᵇ of Fig. 1ª.

Figs. 13, 14 and 15 are sectional views on the lines 13—13, 14—14, and 15—15 respectively, of Fig. 5; Fig. 14ª is a transverse view on the line 14ª—14ª of Fig. 14;

Fig. 16 is a transverse view on the line 16—16 of Fig. 5;

Fig. 17ª is a perspective view of the sliding dog or pin shown in Fig. 17.

The machine frame is formed of side bars 2, supported at either end by legs 3 and at the center by side plates 6, in which the main shaft bearings are journaled, the plates being extended upwardly to form guide frames 7 for the cutter knife.

The cutting table comprises a feed portion consisting of a series of parallel conveyor chains 10 located in front of the cutter and carried by sprockets 12 and 14 mounted on shafts 15 and 16, and a delivery or discharge portion consisting of a series of chains 18 in the rear of the cutter, carried by sprockets 19 and 20, mounted on shafts 21 and 23, journalled in the side frame bars. The front series of conveyor chains 10 of the feeding table is connected with the main drive shaft 25 by means of the sprocket chain 26 and the sprockets 27 and 28, the rear conveyor chains 18 of the table being actuated simultaneously with the forward conveyor chains 10 during the feeding operation, by means of the sprocket chain 29 and the sprockets 30 and 31.

The conveyor chains of the feed table operate simultaneously at the same speed while the veneer sheet is being moved into position and are then stopped while the cutter blade descends. When the cutter is moving upwardly on its return stroke, the rear conveyor chains are caused to move very rapidly to discharge the severed veneer panel from the table. For the purpose of effecting these operations I employ the clutch mechanism and operative connections illustrated in detail in Figs. 5, 6, 7 and 11 to 18 inclusive. The pulley 35 on the power shaft 25 is connected to any suitable source of power. The clutch member 36 is splined to the shaft and is normally forced into engagement with the loose clutch member 36ª by the spring 37. The clutch member 36ª is splined to the sleeve 38, which carries the sprocket 30 upon which the sprocket chain 29 operates to drive the rear set of conveyor chains 18, these chains being therefore normally in operation. The sprocket 27 which drives the forward set of conveyor chains is carried by a sleeve 40, which is provided with clutch teeth 41 adapted to interlock with the clutch teeth 42 on the hub of the clutch member 36ª when the sleeve 40 is slid to the left. By depressing the pedal 45 which is loose upon shaft 81, the link 46 and yoke 47 are moved to the left, thereby sliding the sleeve 40 until the clutch teeth 41 and 42 interlock, thus driving the sprocket 27 and causing the operation of the forward conveyor chains 10. The rear conveyor chains will also be in operation since the sprocket 30 is directly connected with the clutch member 36ª. As soon as the desired length of veneer has been fed upon the table the operator depresses the pedal 50, which causes the cutter to descend and also instantly separates the clutch members 36, 36ª, thereby disconnecting the sprockets 27 and 30 from the power shaft.

Figures 1, 1A, 1B:
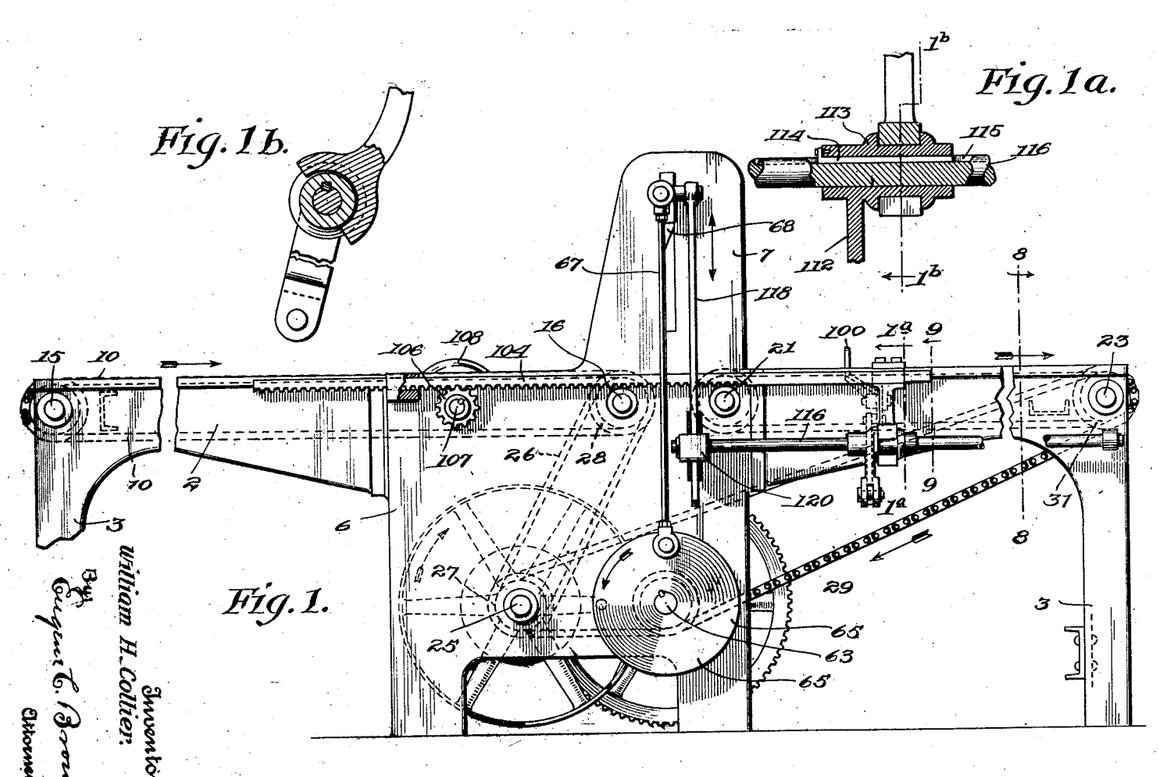
Figures 2, 11, 12:
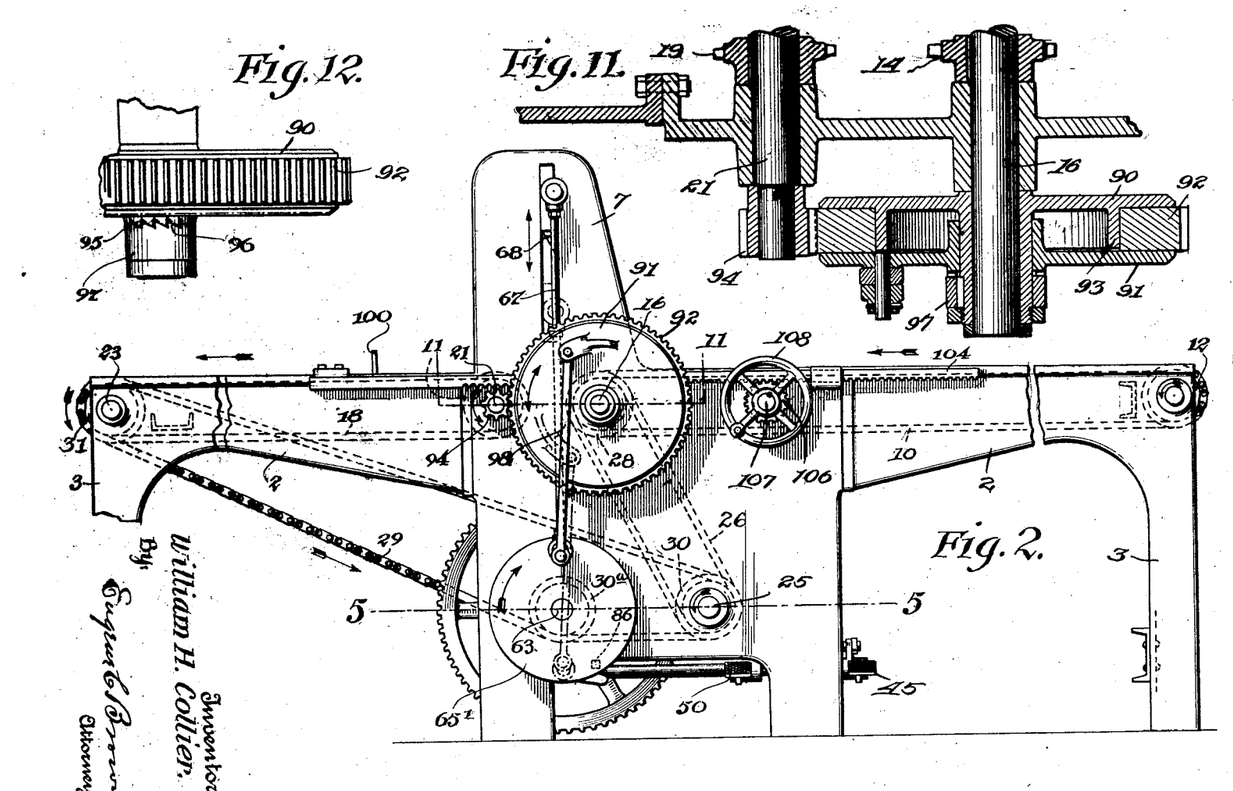
Fig. 2 is a side elevation of the machine viewed from the side opposite Fig. 1.
Fig. 11 is an enlarged detail sectional view on the line 11—11 of Fig. 2.
Fig. 12 is a fragmentary view of the gear shown in Fig. 11.
Figure 3:
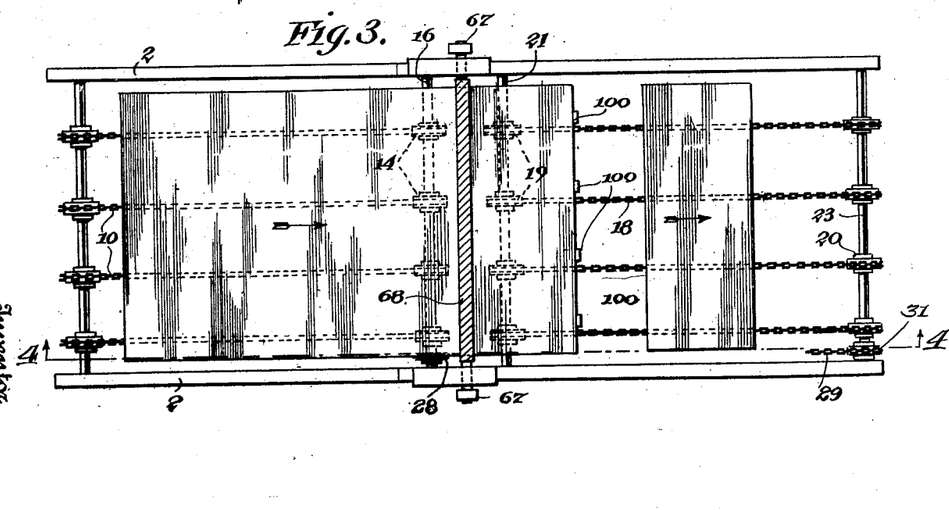
Fig. 3 is a top plan view of the feed table with the operating mechanism omitted.
Figure 4:
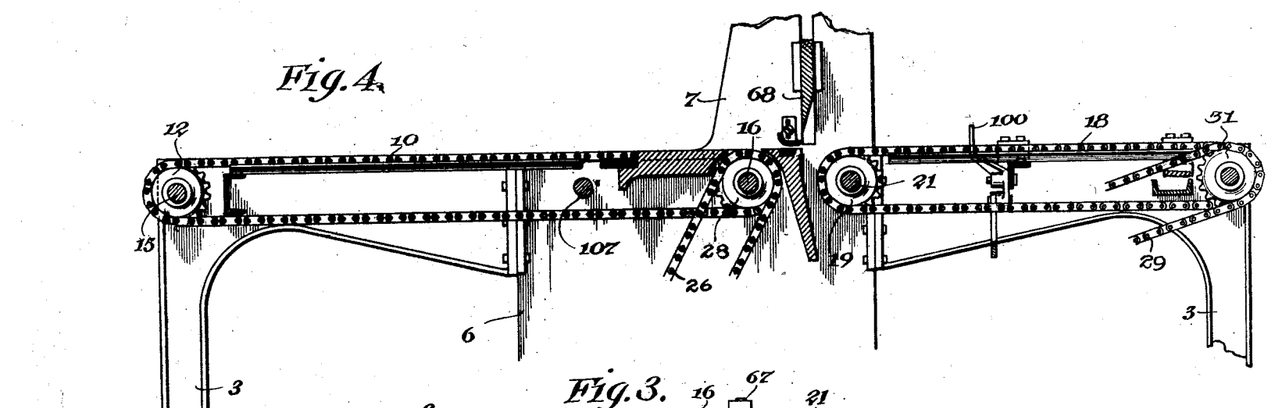
Fig. 4 is a vertical sectional view on the line 4—4 of Fig. 3.
Figure 5:
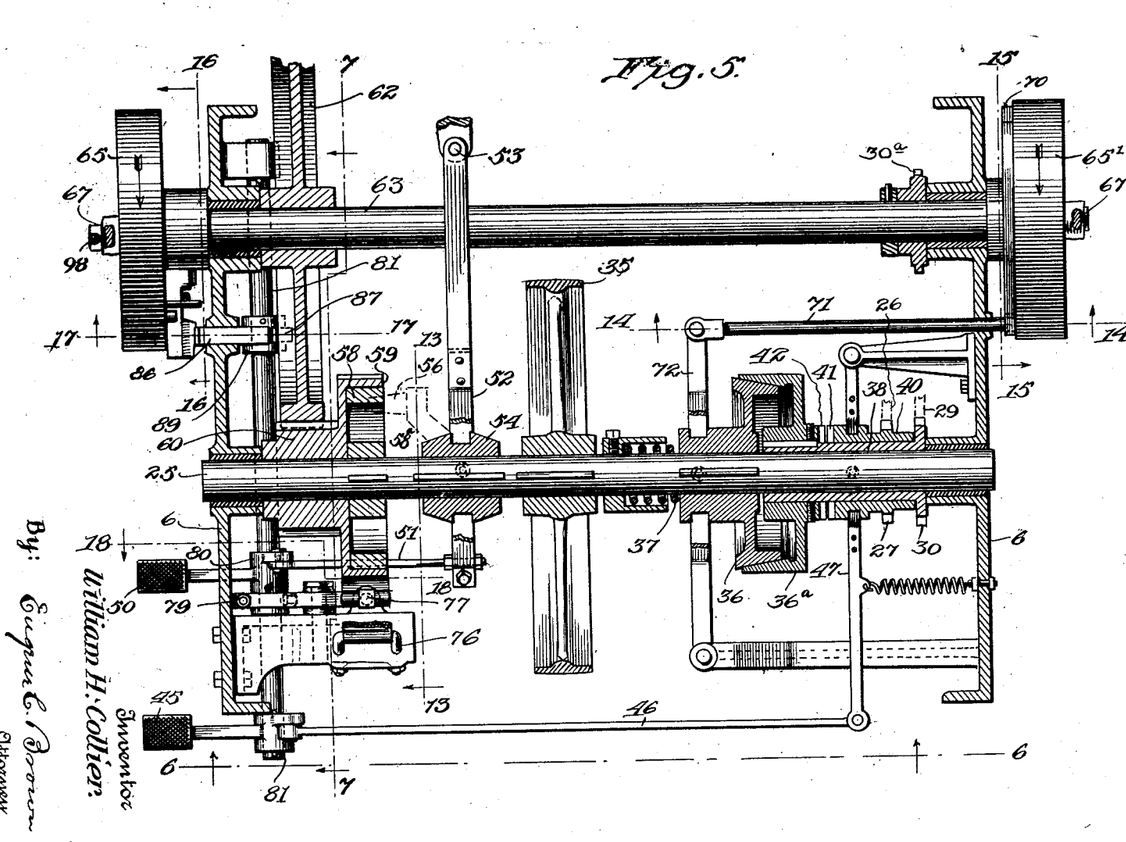
Fig. 5 is a horizontal sectional view on the line 5—5 of Fig. 2.
Figure 6:
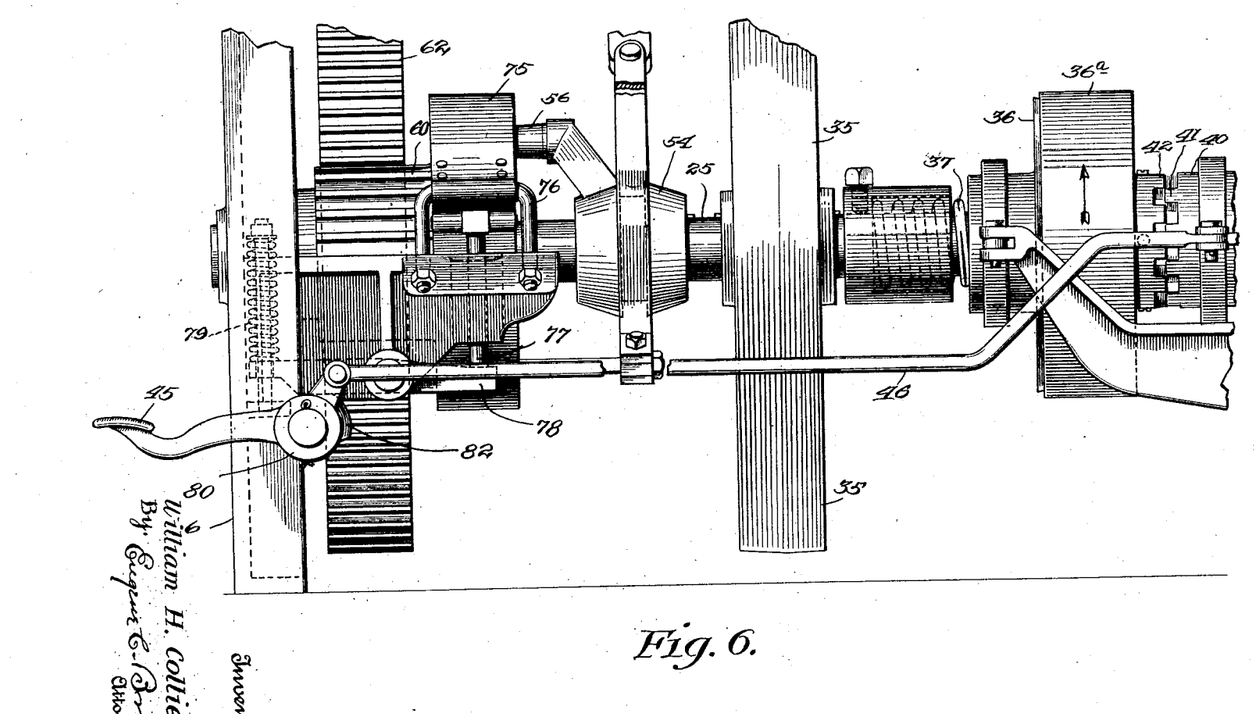
Fig. 6 is a fragmentary side elevation on the line 6—6 of Fig. 5.
Figure 7:
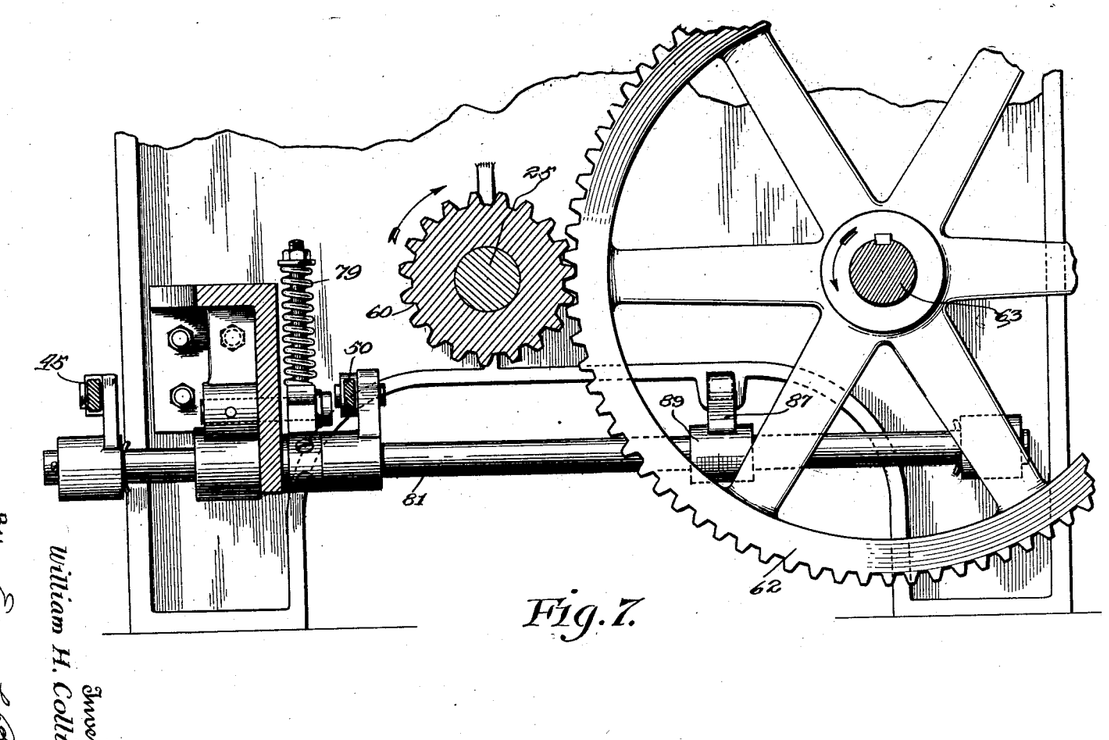
Fig. 7 is a fragmentary vertical sectional view on the line 7—7 of Fig. 5.
Figures 8, 9, 10:
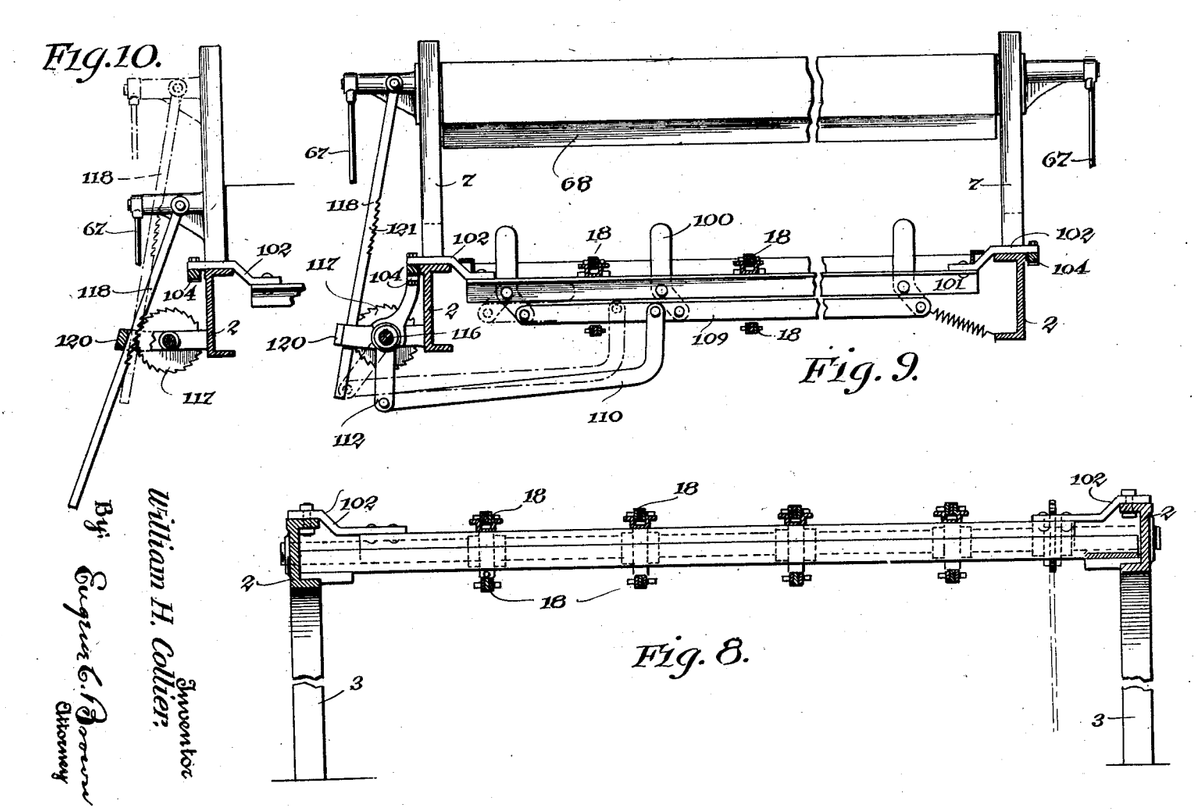
Fig. 8 is a vertical sectional view on the line 8—8 of Fig. 1.
Fig. 9 is a vertical sectional view on the line 9—9 of Fig. 1.
Fig. 10 is a fragmentary view of the left hand portion of Fig. 9 showing the operating parts in a different position.
Figures 13, 14, 14A, 15:
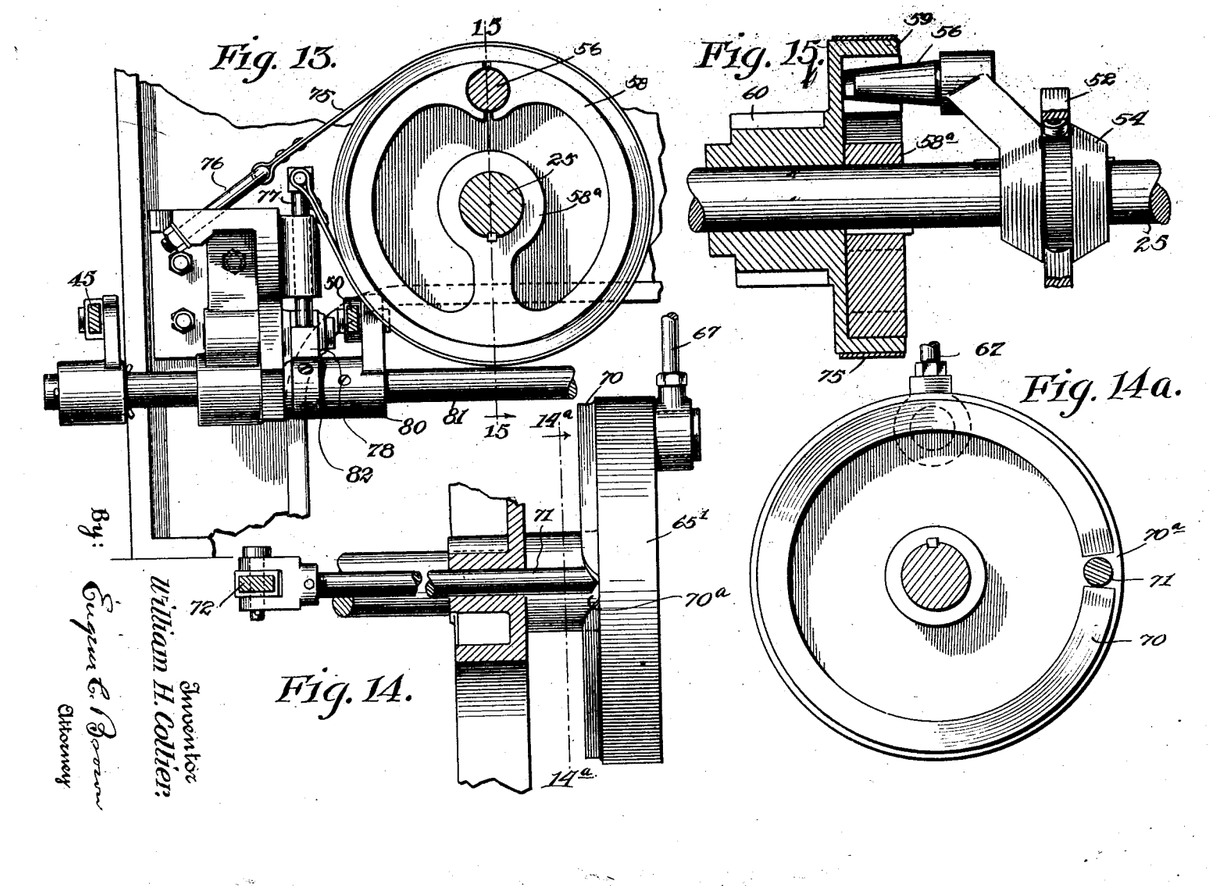
Figures 16, 17A:
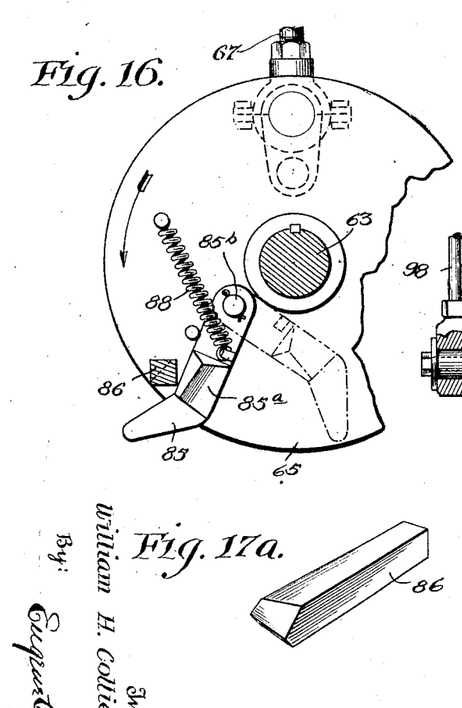
Figures 17, 18:
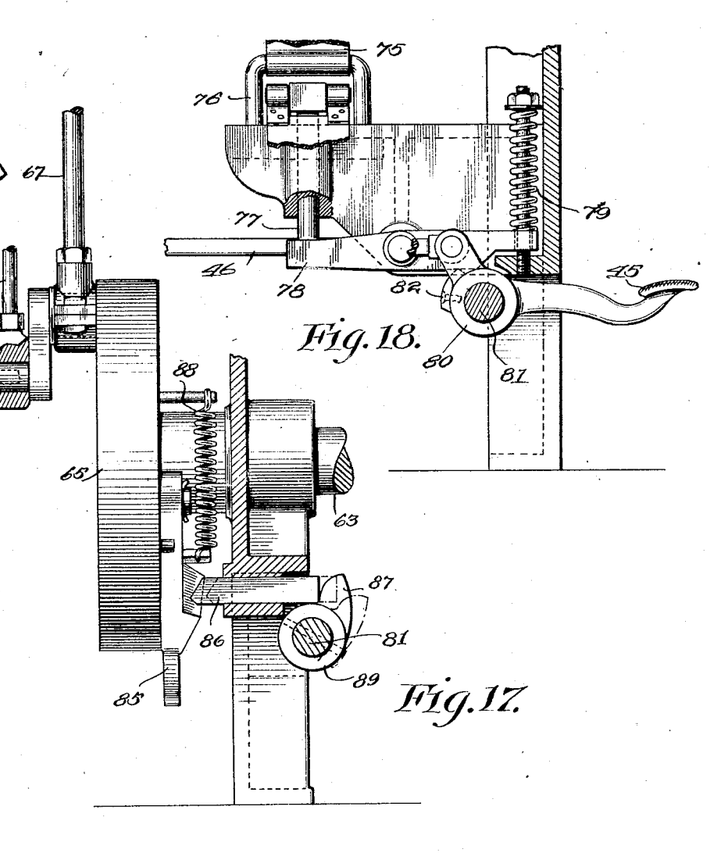
Fig. 17 is a sectional view on the line 17—17 of Fig. 5.
Fig. 18 is a sectional view on the line 18—18 of Fig. 5.

The pedal 50 is connected by the link 51 and yoke member 52, fulcrumed at 53, to the hub 54 slidably splined to the shaft 25 and carrying a wedge pin 56, which is adapted to spread the split ring clutch member 58 against the inner periphery of the annular flange 59, carried by the pinion 60. The expansible clutch ring 58 is provided with a hub 58ª which is splined to the shaft 25. When, therefore, the pin 56 forces the split ring 58 outwardly into engagement with the annular flange 59, the pinion 60 is thereby locked to the shaft 25, so that power is transmitted from the pinion to the gear 62, carried by the shaft 63, which shaft carries the pulleys 65 and 65′ that are connected through the links 67 with the cutter blade 68 to cause its reciprocatory movement. The pulley 65′ is provided upon its inner face with a cam ring 70 which engages the link rod to cause the yoke 72 to shift the clutch member 36 out of engagement with the clutch member 36ª, except when the pulley is in the position to permit the end of the rod 71 to move into the space between the ends of the cam ring 70, as indicated in Figs. 14 and 14ª, the parts being so arranged that this occurs when the cutter blade is retracted into its uppermost position. It is evident therefore that as soon as the shaft 63 is actuated to cause the cutter to move downwardly, the end of the rod 71 will immediately engage the cam ring 70, thereby separating the clutch members 36 and 36ª and disconnecting the sprockets 27 and 30 from the power shaft 25 so that the conveyor chains are stopped.

It is essential that the cutter operating shaft 63, should stop at the instant the pulley 65′ has made a complete revolution and the end of the link-rod 71 has left the cam 70 and moved into the space 70ª. For this purpose I provide a brake-band 75 which surrounds the flange 59, one end being anchored to the yoke-bolt 76, secured to the frame, and the other end being attached to a plunger 77, that is normally pushed upward by one end of a lever 78, the opposite end of which is forced downward by a spring 79. When the pedal 50 is depressed, the collar 80, which is pinned or otherwise fast on the rocker-shaft 81, is rocked and a cam lug 82 thereon engages and lifts one end of the lever 78 against the tension of the spring 79, thereby lowering the other end of the lever, permitting the plunger 77 to drop and loosen the brake band 75. The pulley 65 carries upon its inner face a pivoted dog 85, having a wedge shaped lug 85ª which engages the bevelled end of a sliding pin or bolt 86, at the instant the pulley has made a complete revolution and the cutter blade is in its uppermost position. As the pin is slid inward by the lug 85ª, its inner end pushes against a cam lug 87, carried by a collar 89, fast on the shaft 81, thereby rocking the shaft and causing the lug 82 to recede from the lever 78, thus permitting the spring 79 to throw the lever 78 against the plunger 77, and tighten the brake band 75. The upward movement of the pedal 50 also operates through the link 51 and the yoke bar 52 to retract the wedge pin 56 from the clutch ring 58, thus freeing the flange 59 and pinion 60 from the drive shaft simultaneously with the application of the brake. It will be remembered also that at the same instant, the end of rod 71 is freed from the cam ring 70, entering the space 70ª and thus permitting the spring 37 to slide the clutch member 36 into the member 36ª, which connects the sprocket 30 to the drive shaft and operates the rear set of conveyor chains 18. In this manner the conveyor chains at the delivery end of the feed table are set in operation automatically at the instant the cutter blade reaches its uppermost position. It is desirable, however, that the panel length which has been severed by the cutter should be removed from the table during the upstroke of the cutter. For this purpose a clutch mechanism is provided comprising discs 90 and 91, loosely mounted upon shaft 16, having between them a loosely mounted gear ring 92 surrounding a flange 93 on the disc 90, the gear ring 92 meshing with a pinion 94 fast on the end of the shaft 21, see Figs. 2, 11 and 12. The hub of the disc 91 is provided with ratchet teeth 95 which loosely engage the corresponding teeth 96 upon a collar 97, splined to the hub of the disc 90. A link 98 connects the disc 91 with the disc 65' on the shaft 63. It will be evident that as the disc 65' rotates to move the cutter downwardly, the disc 91 will be rotated counter-clockwise which causes the ratchet teeth 95, 96 to rotate together around the shaft 16 and permits discs 90, 91 to remain slightly separated so that there is no tendency to move the gear ring 92. On the upward stroke of the cutter, however, the disc 91 is caused to rotate in the opposite or clockwise direction, so that the teeth 95 tend to move over the teeth 96 and the wedging action thus produced pushes the disc 91 toward the disc 90, so that the gear ring 92 is tightly gripped and caused to move around with the discs 90 and 91. This rotation of the gear ring 92 is transmitted through the pinion 94 to the shaft 21, which carries the sprockets 19, over which the rear conveyor chains 18 pass. Accordingly, this rotation of the gear ring 92, which is of large diameter compared with the pinion 94, causes the rear conveyor chains to move very rapidly while the cutter blade is moving upwardly upon its return stroke. It will be observed that this rapid movement of the rear chains is effected during the time that the sprockets 27 and 30 are entirely disconnected from the main drive shaft 25.

It is sometimes desirable to keep the cutter in continous operation for a certain period while maintaining the conveyor chains disconnected from the power shaft. To effect this operation it is merely necessary to push the dog 85 with the foot over into the position shown in dotted lines in Fig. 16, so that the lug 85ª will escape the push pin 86 during the revolution of the disc 65. The dog will be held in this inoperative position by the spring 88, which has then been shifted to the opposite side of the pivot pin 85ᵇ. During this continuous operation of the cutter blade, the rear chains will, of course, be operated during each return stroke of the cutter to remove successively the severed portions of any material that may be manually pushed over the feed table.

The stop bars 100 which gauge the length of the panels that are cut from the veneer sheets are pivotally secured to a bar 101 attached to supports 102, which slide upon the side frame bars 2. The stop bars are adjusted to the desired distance from the cutter by means of rack bars 104, secured to the outer ends of the sliding supports 102, the racks being engaged by pinions 106, carried upon a shaft 107, which may be rotated by means of the hand wheel 108. The lower ends of the stop bars 100 are pivoted to a swinging bar 109, connected by link 110 to an arm 112 having a hub 113, which carries a spline 114 slidingly mounted in a groove 115 in the rock shaft 116, to one end of which is secured a ratchet disc 117. A swinging link rod 118, pivoted at its upper end to the frame of the cutter blade, slides through a guide yoke 120 over the ratchet disc and is provided with ratchet teeth 121, which are adapted to engage the teeth of the ratchet disc 117 as the cutter starts upon its upward return stroke, thereby rotating the rock shaft 116 which operates through the arm 112 and link 110 to swing the bar 109 in a direction to swing the stop bars 100 below the level of the feed table to permit the severed panel to pass thereover as it is being removed by the discharge conveyor chains during the upward stroke of the cutter.

The operation of the machine will be understood from the previous detailed description of the several parts of the mechanism. When the veneer sheet is delivered to the table, the operator determines at a glance the length which may be cut without imperfections and sets the stops 100 at the proper distance from the cutter by turning the hand wheel 108 until the corresponding guage or scale mark on the rack bar 104 is brought opposite to an indicator point on the frame. He then depresses the pedal 45 to shift the collar 40 until the teeth 41 are brought into engagement with the teeth 42. This causes the sprockets 27 and 30 to be driven by the power shaft 25 through the clutch 36, 36ª and the feed chains will move the veneer sheet over the table until it engages the stops 100. The operator then releases the pedal 45 and immediately depresses the pedal 50, which operates in the manner previously described, to connect the cutter mechanism with the power shaft and simultaneously disconnect the conveyor chains. Upon the upstroke of the cutter, the stop bars 100 are lowered and the rear chains are operated at an increased speed to rapidly discharge the severed veneer panel. At the instant the cutter reaches its uppermost position, the lug on the dog 85 engages the push pin 86, which operates in the manner described, to disconnect the pinion 60 from the power shaft and apply the brake band 75, thereby instantly stopping the rotation of the shaft 63 which is connected to the cutter. At the same moment the link rod 71 leaves the cam ring 70 and enters the space 70ª, thus permitting the spring 37 to again connect the clutch members 36, 36ª, thereby connecting the sprocket 30 with the drive shaft and setting the rear conveyor chains into operation. When a defective portion appears in a veneer sheet, the feed chains may be kept in operation by maintaining the pedal 45 depressed and manually lowering the stop bars 100 until the defective portion has passed over the table. The operator may thus eliminate all defects so that only perfect panels are cut.

I claim:—

1. In a machine of the type described for operating upon a web or sheet of material, the combination of forward and rear sets of conveyor bands operating at opposite ends of a feed table, means for connecting both sets to a power shaft and for connecting the rear set thereto independently, a cutter reciprocable between the inner ends of said conveyor sets, and means operatively connected to said cutter for disconnecting both sets from the power shaft during its cutting stroke and for restoring the connection of the rear set to the power shaft at the termination of its return stroke.

2. In a machine as set forth in claim 1, means for throwing out the restoring means at will to thereby cause the continued reciprocation of the cutter for any desired period.

3. A web or sheet shearing machine, comprising feeding and discharge sets of feed table conveyor bands, a cutter reciprocable between the inner ends of said sets, a continuously operating power shaft, a main clutch normally connecting said discharge set to the power shaft, a manually controlled clutch for connecting said feeding set with said main clutch, a counter-shaft operatively connected to said cutter, manually controlled means for connecting said counter-shaft to said power shaft, and means actuated by said counter-shaft for automatically disconnecting said main clutch during the cutting stroke and for restoring said main clutch, and disconnecting the counter-shaft and applying a brake to the latter upon the completion of the return stroke of the cutter.

4. A web or sheet shearing machine, comprising feeding and discharge sets of feed table conveyor bands, a cutter reciprocable toward and from the feed table, a main clutch normally connecting said discharge set to the power shaft, manually controlled means for connecting said feeding set with the power shaft, means for operatively connecting said cutter to the power shaft, and means operatively connected to the cutter for automatically disconnecting said conveyor bands from the power shaft during the cutting stroke of the cutter, for operating the discharge set during the return stroke, and for restoring said main clutch and disconnecting said cutter upon the completion of its return stroke.

In testimony whereof I affix my signature.

WILLIAM H. COLLIER.